United States Patent
Karode et al.

(10) Patent No.: US 6,989,097 B2
(45) Date of Patent: Jan. 24, 2006

(54) FEED SPACERS FOR FILTRATION MEMBRANE MODULES

(75) Inventors: Sandeep K. Karode, Wilmington, DE (US); Ashwani Kumar, Orleans (CA)

(73) Assignee: National Research Council of Canada (CA)

(*) Notice: Subject to any disclaimer, the term of this patent is extended or adjusted under 35 U.S.C. 154(b) by 218 days.

(21) Appl. No.: 10/438,993

(22) Filed: May 16, 2003

(65) Prior Publication Data

US 2004/0226877 A1 Nov. 18, 2004

(51) Int. Cl.
    *B01D 29/07* (2006.01)

(52) U.S. Cl. .................. 210/493.4; 210/321.74; 210/321.76; 210/321.83; 210/321.85; 210/650; 210/651; 210/652; 96/4; 96/11; 55/520

(58) Field of Classification Search ............ 210/321.74, 210/321.76, 321.83, 321.85, 493.4, 650–652; 96/4–11; 55/520
See application file for complete search history.

(56) References Cited

U.S. PATENT DOCUMENTS 3,554,853 A * 1/1971 Mercer et al. .............. 428/134
4,902,417 A * 2/1990 Lien ....................... 210/321.74

FOREIGN PATENT DOCUMENTS

JP        63319003 A  * 12/1988

OTHER PUBLICATIONS

Karode and Kumar, "Flow visualization through spacer filled channels . . . ", J. Memb. Sci 193 (2001) 69–84.*

"Spacer characterization and Pressure Drop Modelling In Spacer–filled channels for ultrafiltration," Journal of Membrane Science, 87 (1994) 79–98, A.R. Da Costa, A.G. Fane and D.E. Wiley.

"Mass Transfer And Pressure Loss in Spiral Wound Modules," Desalination 64 (1987) 339–352, G. Schock, A. Miguel.

* cited by examiner

*Primary Examiner*—W. L. Walker
*Assistant Examiner*—Krishnan S Menon
(74) *Attorney, Agent, or Firm*—Ira S. Dorman

(57) ABSTRACT

The invention disclosed relates to feed spacers used in various filtration membrane modules, such as in spiral wound membranes, used in cross-flow filtration. Such spacers have an influence in promoting the mixing between the bulk of the fluid and the fluid element adjacent to the membrane surface so as to keep the membrane surface relatively clean. To optimize these properties, novel spacer designs are disclosed having a plurality of rows of elongated strands, the strands in each row being arranged substantially in parallel to one another, with adjacent rows being attached and disposed at an angle to one another, the strands of at least one row when viewed in cross-section having a central portion of a width smaller than the width of its extremities. Novel membrane modules incorporating such feed spacers are also disclosed.

9 Claims, 5 Drawing Sheets

FEED SPACERS FOR FILTRATION MEMBRANE MODULES

FIELD OF THE INVENTION

The present invention relates to a feed spacer for filtration membrane modules used in cross-flow filtration. More particularly, it concerns the novel cross-sectional shape of the spacer strands, which are arranged in a plurality of rows to constitute a feed spacer mesh.

BACKGROUND OF THE INVENTION

Net-type spacers are an essential feature in commercially available filtration membrane modules. For example, they are an essential feature of the spirally wound module cartridges used in cross-flow ultrafiltration or in reverse-osmosis separation equipment. Such spacers play a dual role, first, keeping adjacent membrane leaves apart so as to form a feed channel therebetween and, second, promoting the mixing between the bulk of the fluid and the fluid element adjacent to the membrane surface so as to keep the membrane surface relatively clean. Efficient membrane module performance depends on the efficacy of the spacers to increase mass transport away from the membrane surface so as to reduce concentration polarization by enhancing mixing at the membrane surface.

The spacer has a plurality of rows of elongated strands, for example two rows. The strands of a same row are substantially parallel to each other, The rows are disposed in layers where the strands of one row are attached to, typically by fusion, and generally crossing the strands of adjacent rows at an angle.

Several propositions have been made regarding the shape and dimensions of the strands (referred as filaments in some documents) and to the crossing angles of the strands in the mesh (referred as net in some documents), For example, the use of spacers in the prior art has been mainly as part of the development of membrane modules. For example U.S. Pat. No. 4,861,487, describes that elongated strands of spacers are placed parallel to flow of fluid before making the spirals. In U.S. Pat. No. 5,429,744 a module is made with a spacer material glued to the membrane. In U.S. Pat. No. 4,834,881 a corrugated type of spacer has been described. This type of spacer is claimed to distribute the flow of raw water efficiently. In U.S. Pat. No. 4,902,417 a detailed description of making a spiral wound membrane module is given for application to various types of feeds. The shape of the strands of the spacers is vaguely discussed in this patent document. Also, the description does not mention clearly any specific shapes, and fails to provide any dimensional ratios.

Da Costa et al. (Journal of Membrane Science, 87 (1994) 79–98) have studied effects on pressure drop and flux in a flat sheet membrane system in rectangular cells where a channel between a membrane layer and a top cover is spacer filled. These authors concluded that (FIG. 6 on page 88 of this document): "fluid flows in zig-zag path, changing direction at each mesh".

Karode and Kumar (Journal of Membrane Science, 193 (2001) 69–84) have estimated pressure drop by solving Navier-Stokes equations in 3D flow domains in similar spacer filled channels and found that observations made by Da Costa et al. were not accurate. Pressure drops and shear rates for various commercially available spacers were also determined with simulations. It was also reported that the dimensions of the strands and angles of intersection of strands in spacers are important parameters. For example, the commercially available spacers included several symmetric and asymmetric spacer designs, the former including two fused together rows of strands crossing each other at an angle, and being of the same plastics material, inter-strand spacing, circular cross-sectional shape and diameter, and the latter differing in its diameter and inter-strand spacing. A further variation in that the two rows of strands cross each other at different angles to each other and to the longitudinal axis of the channel, was also disclosed.

SUMMARY OF THE INVENTION

According to the invention, we have found that the unique cross-sectional shape of strands of spacers provide significant advantages over the commercially available spacers.

More specifically, a feed spacer according to the invention has been found to improve the fluid flow characteristics, resulting in higher efficiency of the associated membrane module, as a result of a lower pressure drop across the membrane.

Thus, according to one embodiment of the invention, a filtration membrane spacer is provided, comprising a plurality of rows of elongated strands, the strands in each row being arranged substantially in parallel to one another, with adjacent rows being attached and disposed at an angle to one another, the strands of at least one row when viewed in cross-section having a central portion of a width smaller than the width of its extremities.

A typical embodiment of a spacer according to the invention comprises two rows of strands fused together.

The central portion may be in the form of a concave surface, a grooved surface or any kind of recessed surface. More specifically, such cross-sections may be in the form of an hourglass (double-concave) or a hexagonal (double-concave groove), as will be apparent hereinafter.

According to another embodiment of the invention, a cross-flow filtration membrane module is provided, the membrane module including at least one layer of a membrane material, a feed flow channel having a longitudinal axis, and a membrane spacer filling the channel comprising a plurality of rows of elongated strands, the strands in each row being arranged substantially in parallel to one another, with adjacent rows being attached and disposed at an angle to one another and to the longitudinal axis, the strands of at least one row when viewed in cross-section having a central portion of a width smaller than the width of its extremities, such that in operation, fluid is flowed into the channel substantially parallel to the longitudinal axis, and the central portion of the strands is presented to the fluid flow.

For example, a flat sheet membrane typically has one membrane layer and includes a fluid flow channel between the membrane layer and the casing of the membrane module. A spiral wound membrane module includes two membrane layers, forming the feed flow channel therebetween,

BRIEF DESCRIPTION OF THE DRAWINGS

The invention will be explained in more detail by way of the following disclosure to be taken in conjunction with the drawings, in which.

DETAILED DESCRIPTION OF THE INVENTION

Figure 1A:
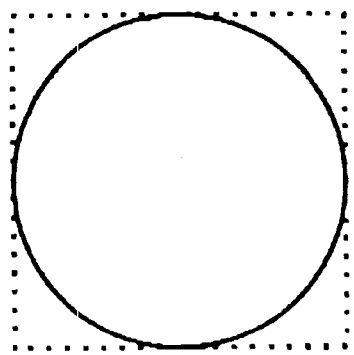
FIG. 1a illustrates a cross-section of a commercially available spacer strand (prior art).

Referring to FIGS. 1a to 1e, cross-sections of various spacer strands are shown. FIG. 1a shows the circular cross-section of commercially available spacers. The side of the enclosed square (dotted line) is equal to the strand diameter, such as the figure known in geometry as a square inscribed circle. In reality, due to the fabrication process, the section varies from circular to slightly ellipsoidal, the minor axis being perpendicular to the length of the spacer web, such as shown on FIG. 3.

Figure 1B:
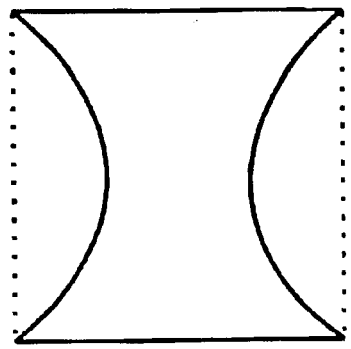
FIGS. 1b to 1e illustrate cross-sections of spacer strands according to different embodiments of the invention.

In a first embodiment of the invention, the spacer strand corresponds to the square shown in dotted line on FIG. 1a, but having two opposite corresponding concave surfaces resulting in the shape, referred as "concave-square", shown on FIG. 1b.

It will be appreciated that the square can be of smaller or larger dimensions, but in the current example the width and height of the enclosing square is kept the same as that in the commercially available spacer for the sake of performance comparison.

Figure 1C:
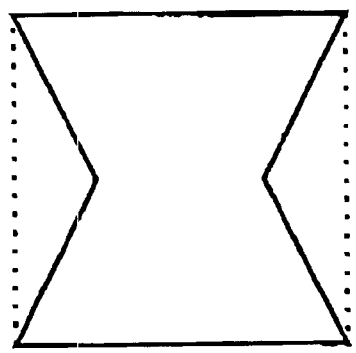

In a second embodiment of the invention, the spacer strand corresponds again to the previous square, but having two opposite V-grooves, resulting in the shape, referred to as "concave-hexagonal", shown on FIG. 1c.

Figure 2:
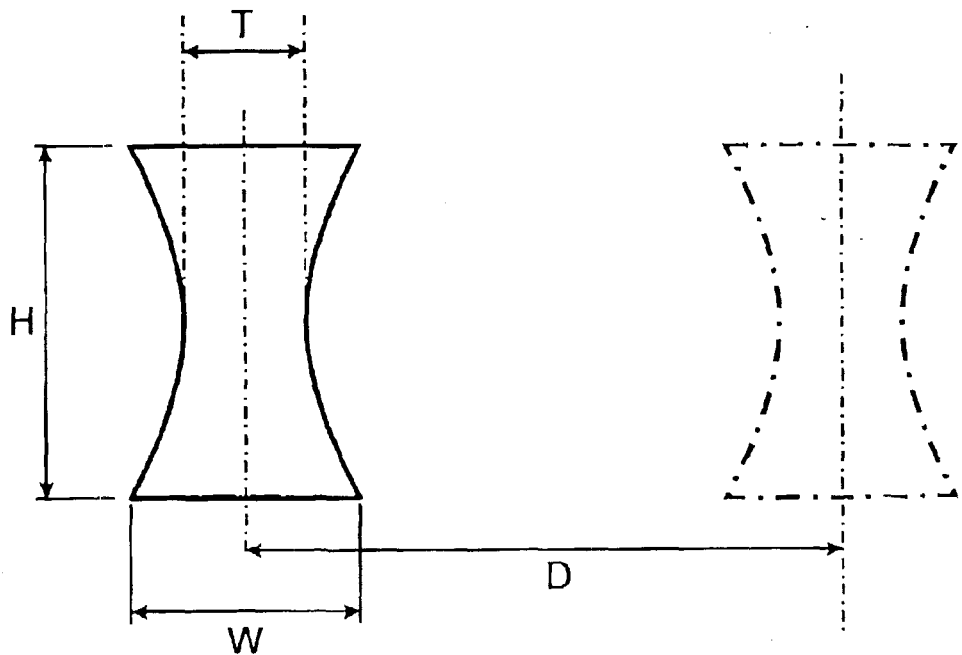
FIG. 2 illustrates a cross-section of two adjacent strands showing dimension variables.

NOW referring to FIG. 2 the different concave embodiments can be expressed as a matter of relation of their different dimensions. W is the width of the strand at its extremities, H is the overall height of the strand, T is the thickness of the strand at its reduced width center portion, and D is inter-strand distance between the center of a strand and the center of the next strand.

Figure 1D:
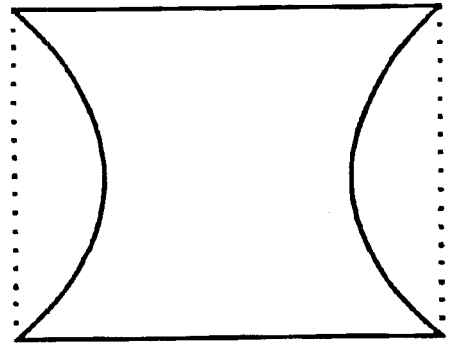
Figure 1E:
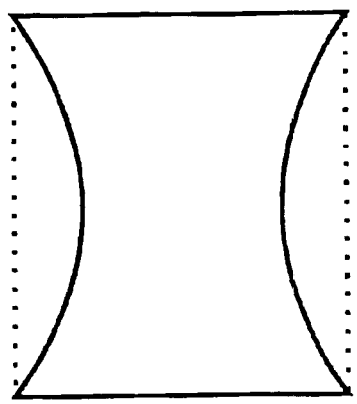

In order to study the effects of varying width to height ratios of the new modified strand, the shapes in a rectangle with cross-sections are shown in FIG. 1d and FIG. 1e ie. where W≠H, In FIG. 1d, the width of the strand is increased by $\frac{1}{3}^{rd}$, keeping the height unchanged (ratio W/H=4/3). This embodiment is referred as "concave-rectangular 4/3". While in FIG. 1e, the height is increased by $\frac{1}{3}^{rd}$ keeping the width unchanged (ratio W/H is 4/3). This last embodiment is referred as "concave-rectangular W/H=3/4".

Figure 3:
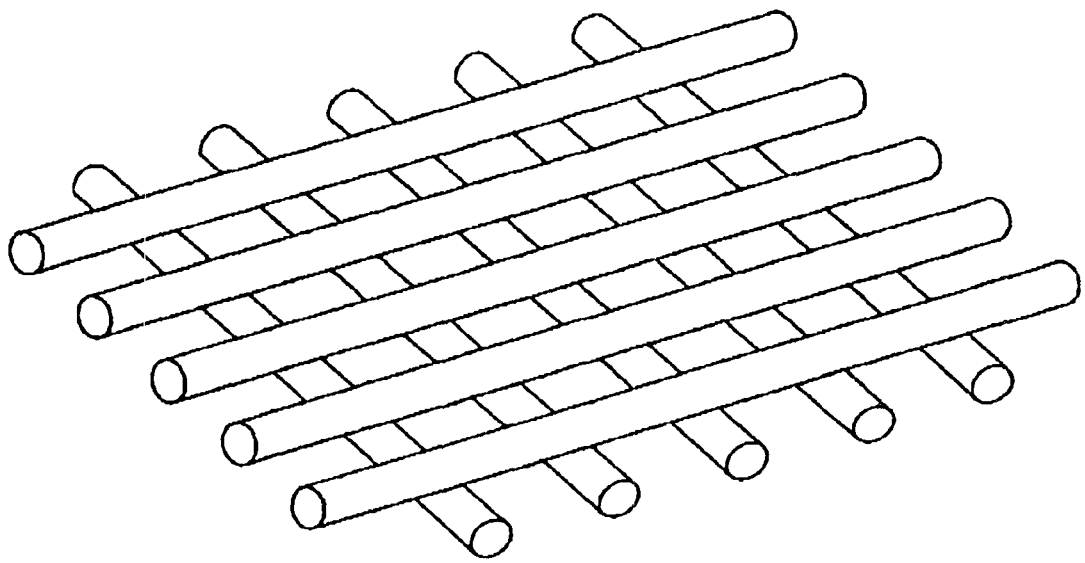
FIG. 3 illustrates prior art net-type spacers having strands of a circular cross-section.
Figure 4:
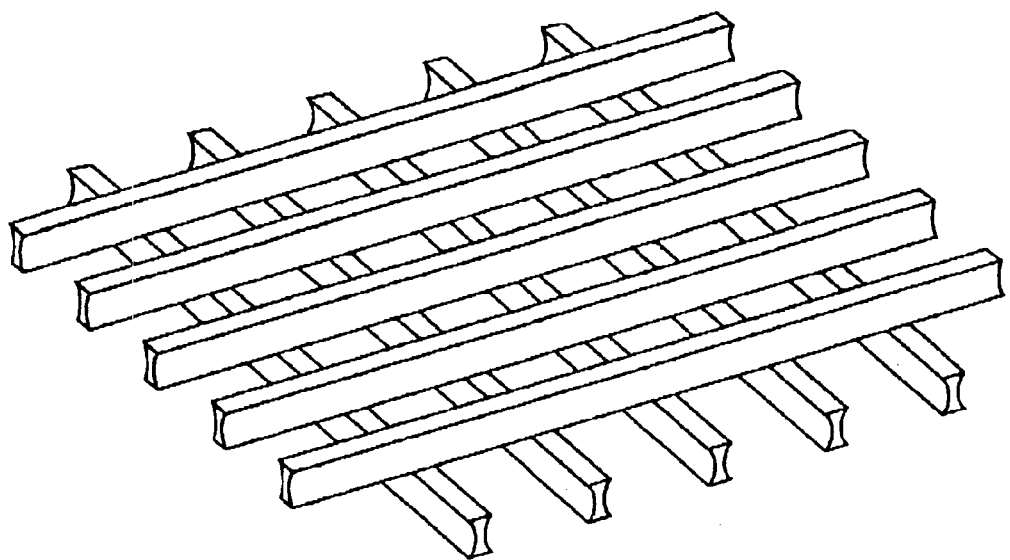
FIG. 4 illustrates a first embodiment of net-type spacers according to the present invention having strands of a double concave cross-section.
Figure 5:
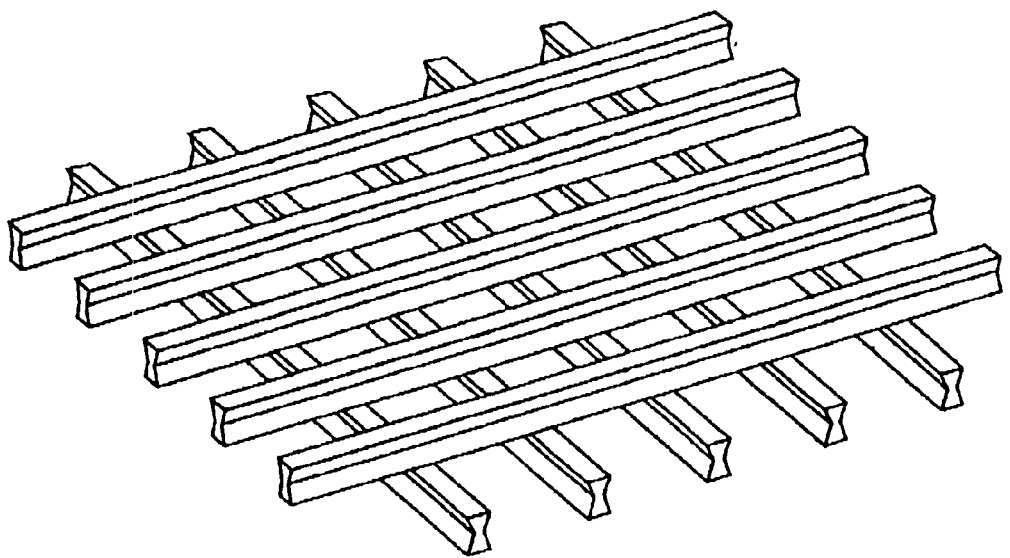
FIG. 5 illustrates a second embodiment of net-type spacers according to the present invention having strands of a double concave hexagonal cross-section.

For a better understanding of the overall arrangement of the strands, FIG. 3 shows in a 3-D model, the prior art spacer having strands such as shown on FIG. 1a. Similarly FIG. 4 shows in a 3-D model the "concave-square" spacer of FIG. 1b, and FIG. 5 shows in a 3-D model the "concave-vertical" spacer of FIG. 1c. All the spacers shown in the 3-CD mode have two layers of strands, the strands in each layer being arranged substantially in parallel, with the layers being fused together at a selected angle. The strands can be of the same (symmetric) or different (asymmetric) thickness. It is also understood that the spacer can have more than two layers of strands, when needed. Also, these spacers can be made or cut to various shapes (e.g. spiral wound) to adapt to different type of membrane modules.

The angles of orientation of each the two rows spacer strands to the longitudinal axis of the channel is fixed as are the other parameters to facilitate comparison between the conventional spacers, and the novel spacers of different cross-sectional strand diameter, such that the only difference is in the cross-sectional shape of the strands. The legend of Table 1 shows these fixed angles. The specific comparisons are shown in comparing the data in Table 1 with that in Table 2.

In operation, the bulk fluid e.g. water, is flowed into the channels in the direction of the longitudinal axis of the channel, the strands being arranged at an angle to the longitudinal axis, such that the reduced width central portion of the strands is presented to the fluid flow, to induce an additional upward velocity to the fluid as it flows past the spacer, which results in higher shear rates on the membrane surface along with a lower pressure drop.

EXAMPLES
Description of the Results and Procedure Used

Membrane modules made with each of the above described novel cross-sectional shapes of strands were modeled using Computational Fluid Dynamics (CFD) to estimate the pressure drop across the membrane module and the velocity profiles by rigorously solving the laminar/turbulent Navier-Stokes equations.

Table 1 shows the geometric characteristics of several commercially available spacers. As described in Karode and Kumar (Journal of Membrane Science, 193 (2001) 69–84), the disclosure of which is incorporated herein by reference, the flow test cell used in simulations included a spacer filled rectangular flow feed channel, used various spacer configurations, and had dimensions of 25 mm wide and 35 mm long. The term "spacer filled" as used herein means that the spacer fills the channel, such that no short-circuiting of the fluid flow between the spacer and the adjacent membrane or membrane module casing occurs.

For simulation purposes, as used herein the context of a flat membrane module, the channel is created between a flat sheet membrane and the membrane module casing. In the case of a spiral wound membrane module, the channel is created between two layers of the membrane. The conventional spacer configurations included symmetric spacers with equal strand diameters and asymmetric spacers with unequal strand diameters.

Bird et al. (Transport Phenomena, Wiley, N.Y., 1982) reported governing equations for steady-state fluid flow with no-slip boundary conditions at all fluid-solid interfaces were used.

The details of simulation procedure can also be be found in Karode and Kumar, Each of the new cross-sections was simulated maintaining the inter-strand spacing and angles of commercially available spacers as shown in Table 1 so as to facilitate meaningful comparisons. Specifically, in Table 1, $h_{sp}$ is height of spacer; $d_f$ is diameter of spacer; $l_f$ is distance between parallel strands, measured perpendicular to the strand; $\epsilon$ is spacer porosity; $\theta$ is hydrodynamic angle, which describes the change in direction of the fluid as it enters the channel, and $d_h$ is hydraulic diameter.

TABLE 1

Geometric characteristics of spacers*

| Spacer name | $h_{sp}$ (×10³ m) | $d_f$ (×10³ m) | $l_f$ (×10³ m) | $\epsilon$ (−) | $\theta$ (deg) | $d_h^k$ (×10³ m) |
|---|---|---|---|---|---|---|
| Conwed-1[a] (S) | 2.01 | 1.03 | 2.17 | 0.618 | 90 | 0.997 |
| UF2[b] (AS) | 1.68 | 0.76 | 4.06 (5.3)** | 0.763 | 0 | 1.375 |
|  |  | (1.07)** |  |  |  |  |
| NALTEX-56[c] (S) | 1.11 | 0.55 | 4.3 | 0.880 | 56 | 1.316 |

*As defined by Schock and Miquel (Desalination, 64 (1987) 339–352)
**lower to longitudinal axis located row
[a]Bottom row 45° to channel axis (anticlockwise); Top row 45° to channel axis (clockwise)
[b]Bottom (thick) strands parallel to channel axis; Top (thin) strands 45° to channel axis (anticlockwise),
[c]Bottom strand 28° to channel axis (anticlockwise); Top strand 28° to channel axis (clockwise)
S = symmetric;
AS = asymmetric
Conwed-1, UF-2 and Naltex-56, are all Trademarks for various easily formable plastics material spacers, such as of polyethylene, polypropylene, polyester and Nylon.
Note that in Table 1, the angle θ represents the sum of the actual angles of orientation of the top and bottom strands to the channel axis. For example, for Conwed-1 type spacers, θ = 45 + 45 = 90°. For simplicity sake, it is conventional to quote the angle of orientation of the two row spacer to the channel axis in terms of the angle of the bottom row of strands to the channel axis. Accordingly, for Conwed-1 types this angle is 45°, for UF2 types the angle is 0° ie. since the bottom row is parallel to the channel axis, and for Naltex-types, the angle is 28°.

For ease in comparison, Table 2 shows the use of the same conventional spacers, with the only difference being in the cross-sectional shape of the strands. It will be appreciated that for comparison purposes, $d_f$ is equivalent to the width of the strands at their extremities. Illustrated is the reduction in pressure drop for each of the new cross-sections as a function of inlet velocity for a flow test cell described earlier in Karode and Kumar (Journal of Membrane Science, 193 (2001) 69–84). Notably, reduction in pressure drop is highest for the Conwed-1 spacer. This is primarily as a result of increased fluid mixing at the plane of intersection of the spacer strands in the new cross-section.

TABLE 2

Variation in pressure drops with change in cross-sectional shapes of various spacers.

| | | | % change in Pressure Drop[a] for New Spacer Cross Section | | | |
|---|---|---|---|---|---|---|
| Spacer Name | Velocity (m/s) | Pressure Drop for unmodified spacer (Pa) | Concave-square | V-Shaped-square | Concave-Rect. W/H = 4/3 | Concave-Rect. W/H = 3/4 |
| Conwed-1 | 0.25 | 1058 | −24 | −12 | NSC | −33 |
| Conwed-1 | 0.5 | 3762 | −31 | −20 | NSC | −39 |
| Conwed-1 | 0.75 | 7368 | −27 | −15 | NSC | NSC |
| Conwed-1 | 1.0 | 13348 | −33 | −21 | −39 | −6 |
| UF2 | 0.25 | 394 | −5 | NSC | NSC | −68 |
| UF2 | 0.5 | 1147 | −5 | −19 | −29 | −34 |
| UF2 | 0.75 | 2255 | −12 | −29 | −18 | −33 |
| UF2 | 1.0 | 3758 | −17 | −34 | −27 | −42 |
| NALTEX-56 | 0.25 | 562 | −10 | −28 | −19 | −36 |
| NALTEX-56 | 0.5 | 1527 | −14 | −11 | −7 | −16 |
| NALTEX-56 | 0.75 | 3595 | −28 | −15 | −19 | −26 |
| NALTEX-56 | 1.0 | 5177 | −11 | −11 | −5 | −13 |

Figure 6:
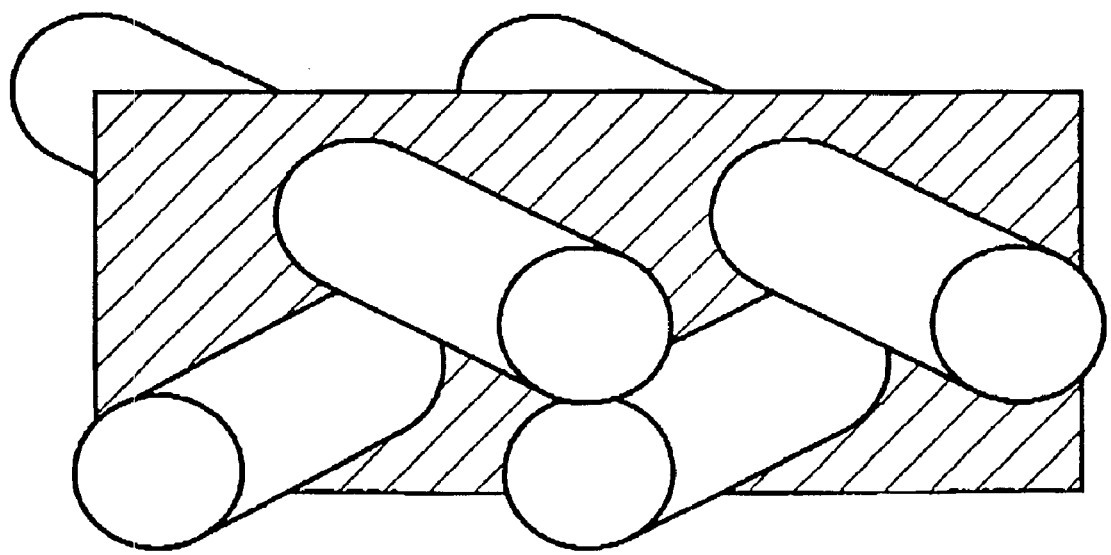
FIG. 6 illustrates the location of the cut in prior art net-type spacers for the two-dimensional fluid flow model of FIG. 8.
Figure 7:
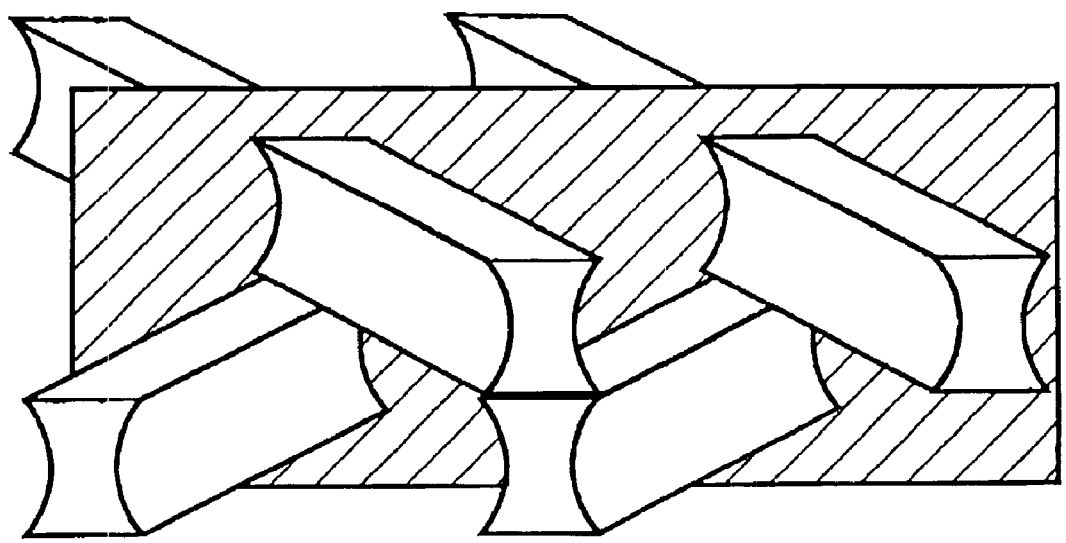
FIG. 7 illustrates the location of the cut for one of the embodiments of the net-type spacers according to the present invention for the two-dimensional fluid flow model of FIG. 9.
Figure 8:
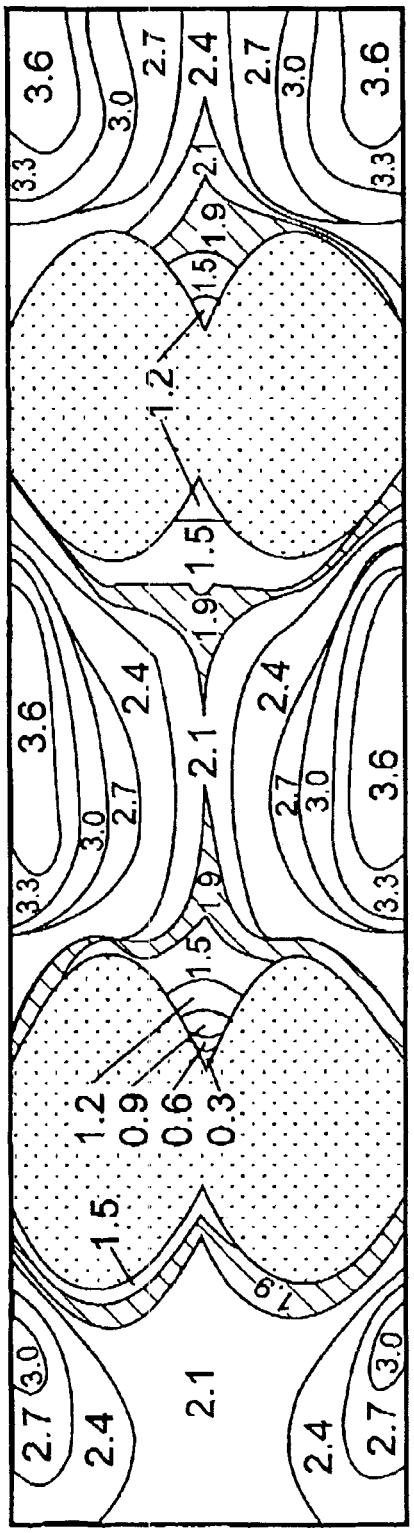
FIG. 8 illustrates velocity profile for prior art net-type spacers.

[a]: % change = $\dfrac{\text{Pressure Drop} - \text{Pressure Drop}_{unmodified}}{\text{Pressure Drop}_{unmodified}} \times 100$ NSC: No Significant Change It was shown in Karode and Kumar (Journal of Membrane Science, 193 (2001) 69–84) that majority of the pressure drop in Conwed-1 spacer was controlled by the change in the direction of the velocity vector across a thin transition region corresponding to the plane of intersection of the spacer strands. FIGS. 6 and 7 show the location of the two dimensions model cut in the 3-D model of respectively the prior art and of the first embodiment spacer. FIG. 8 shows the velocity contours along a constant y section for the Conwed-1 spacer. The dotted section is the location of strands in the cut and the hatched section corresponds to the reference velocity for comparison between the prior art and new spacer. All the values are velocity in m/s. As can be seen, there is very little mixing between the fluid flowing along the axis of the bottom row of strands and the top row. Across the plane of intersection, the velocity vectors undergo an abrupt rotation leading to an increased pressure drop.

Figure 9:
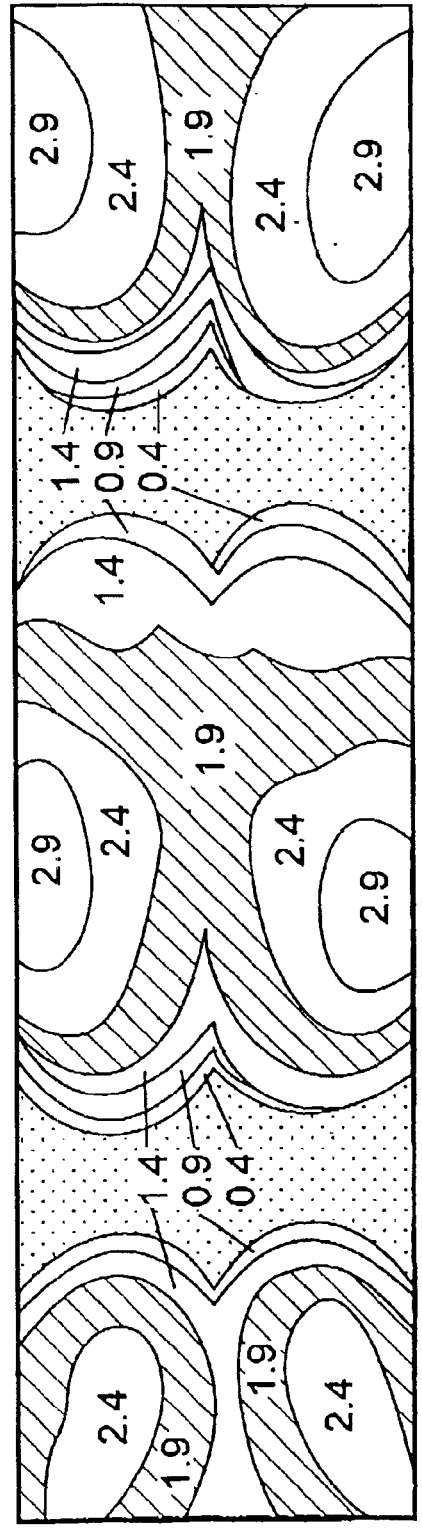
FIG. 9 illustrates velocity profile for one of the embodiments of the net-type spacers according to the present invention.

FIG. 9 shows a similar cross section for the spacer with a cross section corresponding to FIG. 1(*b*). As can be seen, there is enhanced mixing between the fluid flowing along the bottom row of strands and the top row. This mixing is primarily caused by an upward movement of the fluid elements induced by the concave shape of the strand cross-section. Further simulations were performed with four different modifications for all of the spacers listed in Table 1. As can be seen from Table 2, all of these modifications in tested spacers produced significant pressure reductions of up to 42% over their unmodified counterpart.

It is understood that the present invention is not limited to the embodiments described above, but encompasses any and all embodiments within the scope of the following claims.

What is claimed is:

1. A cross-flow filtration membrane module, comprising at least one layer of a membrane material, a feed flow channel having a longitudinal axis, and a membrane spacer filling the channel comprising a plurality of rows of elongated strands, the strands in each row being arranged substantially in parallel to one another, with adjacent rows being attached and disposed at an angle to one another and to the longitudinal axis, the cross section of each strand of at least one row having a portion of a width smaller than the width of its extremities, such that in operation, fluid is flowed into the channel substantially parallel to the longitudinal axis, and the central portion of the strands is presented to the fluid flow.

2. The membrane module of claim 1, wherein the membrane material comprises a plurality of layers of membrane material, each layer being separated by a spacer-filled feed flow channel.

3. The membrane module of claim 2, wherein the membrane material comprises two rows of membrane material in the form of a spiral wound membrane.

4. The membrane module of claim 1, wherein the spacer comprises two rows, the strands of each row when viewed in cross-section having a central portion of a width smaller than the width of its extremities.

5. The membrane module of claim 4, wherein the spacer is symmetric.

6. The membrane module of claim 4, wherein the spacer is asymmetric.

7. The membrane module of claim 5, wherein the spacer is oriented to the channel longitudinal axis at an angle of 28–45°.

8. The membrane module of claim 6, wherein the spacer is oriented to the channel longitudinal axis at an angle of 45°.

9. The membrane module of claim 7, wherein the strand width at its extremities is in the range of $0.55$–$1.03 \times 10^{-3}$ m, and wherein the inter-strand distance is in the range of $2.17$–$4.3 \times 10^{-3}$ m.

* * * * *